(12) United States Patent
Golitschek Edler von Elbwart et al.

(10) Patent No.: US 11,523,422 B2
(45) Date of Patent: Dec. 6, 2022

(54) DETERMINING TRANSPORT BLOCK GENERATION TIMING OF AN UPLINK TRANSMISSION

(71) Applicant: Lenovo (Singapore) PTE. LTD., New Tech Park (SG)

(72) Inventors: Alexander Johann Maria Golitschek Edler von Elbwart, Darmstadt (DE); Joachim Loehr, Wiesbaden (DE); Prateek Basu Mallick, Langen (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/193,804

(22) Filed: Nov. 16, 2018

(65) Prior Publication Data
US 2019/0150184 A1    May 16, 2019

Related U.S. Application Data

(60) Provisional application No. 62/587,188, filed on Nov. 16, 2017.

(51) Int. Cl.
*H04W 72/14* (2009.01)
*H04L 1/18* (2006.01)
(Continued)

(52) U.S. Cl.
CPC .......... *H04W 72/14* (2013.01); *H04L 1/1812* (2013.01); *H04L 1/1887* (2013.01); *H04L 1/1896* (2013.01); *H04W 8/24* (2013.01); *H04W 72/0406* (2013.01); *H04W 72/0446* (2013.01); *H04W 80/02* (2013.01)

(58) Field of Classification Search
CPC ... H04W 72/14; H04W 8/24; H04W 72/0446; H04W 72/0406; H04W 80/02; H04L 1/1887; H04L 1/1896; H04L 1/1812
See application file for complete search history.

(56) References Cited

U.S. PATENT DOCUMENTS

| 10,772,113 B2* | 9/2020 | Yerramalli | ............ H04L 1/0026 |
| 2012/0113946 A1* | 5/2012 | Seo | ........................ H04L 5/0055 370/329 |

(Continued)

OTHER PUBLICATIONS

Huawei, HIsilicon, "Discussion on timing relations for NR frame structure", 3GPP TSG RAN WG1 Meeting #86 R1-166105, Aug. 22-26, 2016, pp. 1-4.

(Continued)

*Primary Examiner* — Nishant Divecha
(74) *Attorney, Agent, or Firm* — Kunzler Bean & Adamson

(57) ABSTRACT

Apparatuses, methods, and systems are disclosed for determining transport block ("TB") generation timing of an uplink transmission. One apparatus includes a processor that identifies a transmit opportunity n for uplink transmission and identifies a timing offset k between reception of an uplink grant and an uplink transmission corresponding to the uplink grant. The processor prepares a TB for uplink transmission, wherein preparing the TB occurs after completing detection of uplink grants in a transmit opportunity n−k. The apparatus also includes a transceiver that that transmits the prepared TB to a mobile communication network.

20 Claims, 10 Drawing Sheets

(51) Int. Cl.
*H04W 8/24* (2009.01)
*H04W 72/04* (2009.01)
*H04W 80/02* (2009.01)

(56) References Cited

U.S. PATENT DOCUMENTS

| | | | |
|---|---|---|---|
| 2016/0164643 A1* | 6/2016 | Loehr | H04L 1/1854 |
| | | | 370/336 |
| 2018/0092071 A1* | 3/2018 | Dinan | H04L 5/0091 |
| 2019/0075581 A1* | 3/2019 | Salem | H04W 72/1289 |

OTHER PUBLICATIONS

Lenovo, Motorola Mobility, "HARQ design for UL grant-free URLLC transmission" 3GPP TSG RAN WG1 Meeting #88 R1-1702667, Feb. 13-17, 2017, pp. 1-3.

Huawei, Hlsilicon, "Inter-PLMN Operations for V2X Sidelink Communication", 3GPP TSG RAN WG2 Meeting #97 R2-1701368, Feb. 13-17, 2017, pp. 1-2.

International Searching Authority, "Notification of Transmittal of the International Search report and the Written Opinion of the International Searching Authority, or the Declaration", PCT/IB2018/001506, May 2, 2019, pp. 1-14.

Ericsson, "On AUL support on LAA sCell", 3GPP TSG RAN WG1 Meeting #90 R1-1713310, Aug. 21-25, 2017, pp. 1-5.

Huawei, Hlsilicon, "HARQ with autonomous uplink access on LAA SCell", 3GPP TSG-RAN WG2 Meeting #99bis R2-1710368, Oct. 9-13, 2017, pp. 1-5.

\* cited by examiner

DETERMINING TRANSPORT BLOCK GENERATION TIMING OF AN UPLINK TRANSMISSION

CROSS-REFERENCE TO RELATED APPLICATIONS

This application claims priority to U.S. Provisional Patent Application No. 62/587,188 entitled "Transport Block Generation Timing for Uplink Transmissions" and filed on Nov. 16, 2017 for Alexander Johann Maria Golitschek Edler von Elbwart, Joachim Lohr, and Prateek Basu Mallick, which is incorporated herein by reference.

FIELD

The subject matter disclosed herein relates generally to wireless communications and more particularly relates to the timing of transport block generation for uplink transmission.

BACKGROUND

The following abbreviations are herewith defined, at least some of which are referred to within the following description: Third Generation Partnership Project ("3GPP"), Positive-Acknowledgment ("ACK"), Autonomous Uplink ("AUL"), AUL Downlink Feedback Information ("AUL-DFP"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Licensed Assisted Access ("eLAA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MC S"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), New Data Indicator ("NDP"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Block Assignment ("RBA"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, such as LTE eLAA, autonomous uplink ("AUL") transmissions are enabled through a combination of RRC signaling and an activation message conveyed by a DCI in a physical control channel. However, a dynamic grant may be received for a subframe, or other transmit opportunity, already scheduled for autonomous uplink transmission.

BRIEF SUMMARY

Methods for determining transport block generation timing of an uplink transmission are disclosed. Apparatuses and systems also perform the functions of the methods.

One method (e.g., of a UE) for determining the timing of TB generation for an uplink transmission includes identifying, at a UE, a transmit opportunity n for uplink transmission and identifying, at the remote unit, a timing offset k between reception of an uplink grant and an uplink transmission corresponding to the uplink grant. The method includes preparing, at the remote unit, a TB for uplink transmission, wherein preparing the TB occurs after completing detection of uplink grants in a transmit opportunity n–k and transmitting the prepared TB.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
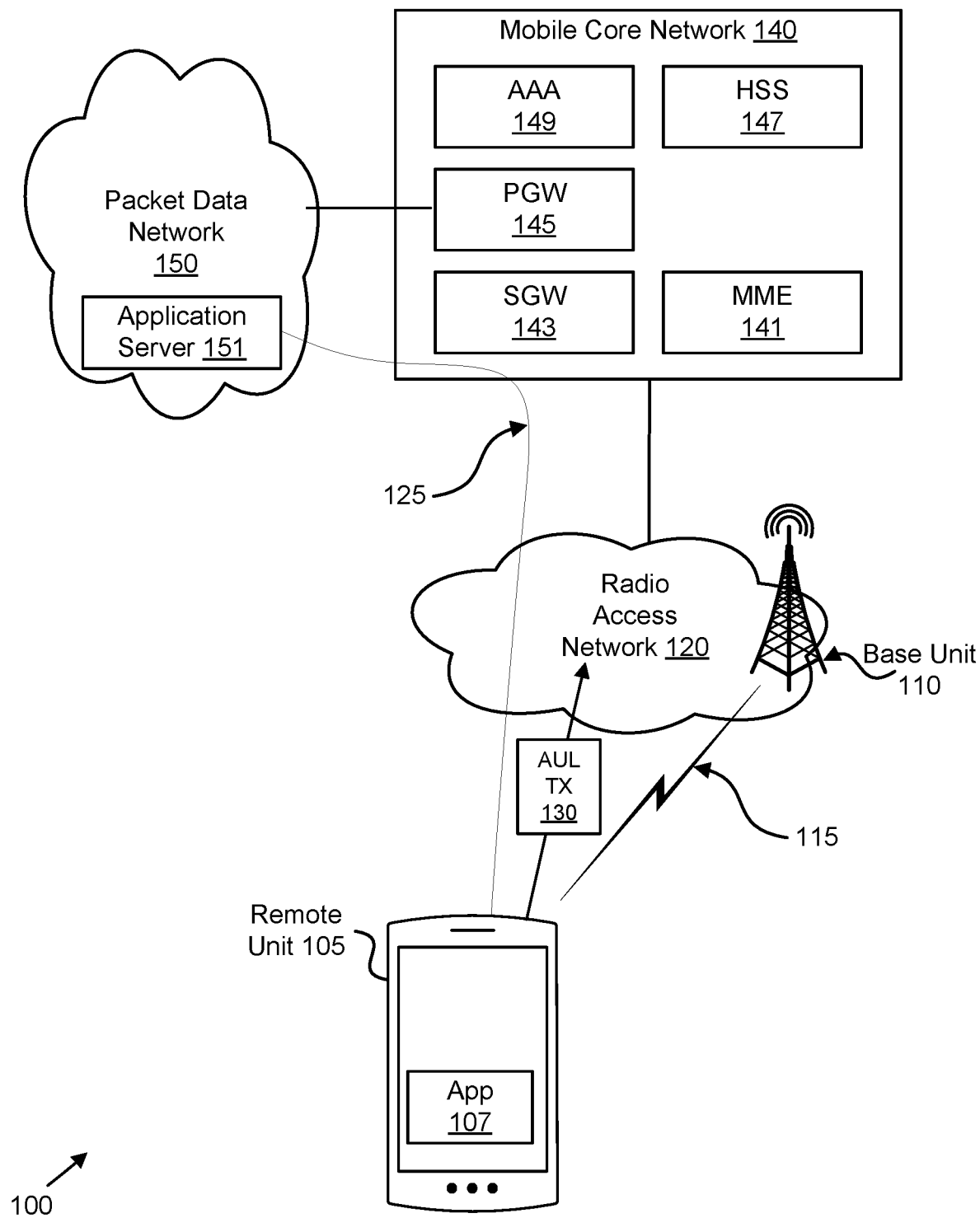
FIG. 1 is a schematic block diagram illustrating one embodiment of a wireless communication system for determining transport block generation timing of an uplink transmission.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

In certain wireless communications networks, such as LTE eLAA, autonomous uplink ("AUL") transmissions are enabled through a combination of RRC signaling and an activation message conveyed by a DCI in a physical control channel. The RRC configuration includes subframes in which the UE is allowed to transmit autonomously, as well as eligible HARQ process IDs. The activation message includes the resource block assignment ("RBA") and MCS, from which the UE is able to determine the transport block size for any AUL transmission. Additionally, DCI may be used to indicate a dynamic grant of uplink resources to the UE. As used herein, a dynamic grant refers to a one-time grant of resources. In contrast, a "configured grant" or a "semi-persistent" grant refers to a grant that is valid over multiple transmit opportunities. One instance of a semi-persistent grant is the AUL transmissions used in LTE systems; however, the present disclosure is not limited to LTE systems or deployments.

It is possible to autonomously retransmit data pertaining to a transport block that has not been received correctly by the eNB. For this purpose, the UE monitors AUL downlink feedback information (e.g., "AUL-DFP"), transmitted by the eNB. The AUL-DFI includes HARQ-ACK information for the AUL-enabled HARQ process IDs. In case the UE detects a NACK message, it may try to autonomously access the channel for a retransmission of the same transport block in the corresponding HARQ process. As a safe-guard against errors, an AUL transmission includes at least the HARQ process ID and a new data indicator ("NDP") accompanying the PUSCH.

It is also possible for the eNB to transmit an uplink grant through a DCI that assigns uplink resources for a retransmission of the same transport block using the indicated HARQ process. It is further possible that the eNB transmits an uplink grant through a DCI that assigns uplink resources for a transmission of a new transport block using the indicated HARQ process. In other words, even though a HARQ process ID may be eligible for AUL transmissions, the eNB still has access to this process at any time through a scheduling grant (e.g., in DCI). Conventionally, if the UE detects a grant for an UL transmission for a subframe that is eligible for AUL (according to the RRC configuration), it will follow the received grant and will not perform an AUL transmission in that subframe.

However, the UE is not permitted to use AUL transmissions for a retransmission of a transport block if that transport block has already been (re)transmitted on resources indicated by an uplink grant. Consequently, the UE can use such a HARQ process again for AUL transmissions only after the UE has been informed that the transport block has been received correctly by the eNB (by a corresponding ACK message in the AUL-DFI), or if a "maximum number/duration of transmissions timer" for that transport block has expired.

As an alternative to transmitting HARQ-ACK via the AUL-DFI, the eNB may send a grant indicating the request of a retransmission (effectively the same as transmitting a NACK for the most recent transmission) or indicating the transmission of a new transport block. For this purpose, the uplink grant contains an NDI field from which the UE determines whether a retransmission or a transmission for a new transport block is being granted.

For non-AUL transmissions (or retransmissions) relying solely on scheduling grants, a UE determines whether a retransmission of the latest transport block or a transmission of a new transport block is triggered in the following fashion: If the NDI in the uplink grant is not toggled compared to the most recently received NDI related to that HARQ process, then the uplink grant is interpreted as requesting a retransmission of the latest transport block in that HARQ process. Otherwise, if the NDI in the uplink grant is toggled compared to the most recently received NDI related to that HARQ process, then the uplink grant is interpreted as requesting a transmission of a new transport block in that HARQ process. Here, "toggled" refers to a change in the bit value.

However, if an uplink grant is to address a HARQ process for which the most recent transmission from the UE was autonomous (e.g., AUL transmission), it is unclear how the UE determines whether a retransmission or a new transmission is requested. Likewise, it is unclear how the UE should determine the value of the NDI field transmitted in the UCI accompanying the PUSCH in an AUL transmission.

Generally, the AUL-DFI (carrying HARQ-ACK) should be transmitted sooner rather than later to a UE, so that it may continue transmissions (or retransmissions) as soon as possible to keep the overall latency of data transmissions small. However, the UE generally will not be able to perform AUL transmissions at any desired time.

In some embodiments, the UE must postpone transmission of an AUL TB due to generating the TB in response to AUL-DFI, but the RRC configuration allowing only specific subframes (or TTIs) for AUL transmissions, which occur at a much later time than the reception of the AUL-DFI. In certain embodiments, the UE must postpone transmission of an AUL TB due to detecting a channel busy condition in subframes that are eligible for AUL transmissions.

In some embodiments, the UE must postpone transmission of an AUL TB due to receiving an UL grant after forming the AUL TB. In certain embodiments, the UE must postpone transmission of a AUL TB due to additional data arriving at the MAC after a transport block for AUL has been formed.

In order to avoid the listed disadvantages, a new UE behavior is specified determining at what time (subframe) the MAC layer forms a transport block for AUL transmissions and hands it to the physical layer—or alternatively/equivalently, determining at what time (subframe) the physical layer requests a new transport block for AUL transmissions from the MAC layer.

In various embodiments, the UE prepares an AUL transmission for subframe n not before it has completed the detection of uplink grants in subframe n–k, with k being the (minimum) time offset between the reception of an uplink grant and the corresponding uplink transmission.

In some embodiments, the UE receives a scheduling grant for a HARQ process eligible for autonomous UL transmissions. Here, if the NDI in the grant is not toggled compared to the reference NDI related to that HARQ process, then the UE identifies that the grant is requesting a retransmission of the latest transport block in that HARQ process. Otherwise, if the NDI in the grant is toggled compared to the reference NDI related to that HARQ process, then the UE identifies that the grant is requesting a transmission of a new transport block in that HARQ process.

Moreover, the UE determines the NDI contained in the UCI for autonomous UL transmissions as follows: if the UE is sending a retransmission of the latest transport block in that HARQ process, then the NDI in the UCI is not toggled compared to a reference NDI related to that HARQ process. However, if the UE is sending a transmission of a new transport block in that HARQ process, the NDI in the UCI is toggled compared to the reference NDI related to that HARQ process.

As used herein, the "reference NDI" refers to the latest NDI for the HARQ process that has been transmitted (e.g., in the UCI accompanying the AUL PUSCH) or received (e.g., in the most recent DCI).

FIG. 1 depicts a wireless communication system 100 for determining transport block generation timing of an uplink transmission, according to embodiments of the disclosure. In one embodiment, the wireless communication system 100 includes at least one remote unit 105, an access network 120 containing at least one base unit 110, wireless communication links 115, and a mobile core network 140. Even though a specific number of remote units 105, access networks 120, base units 110, wireless communication links 115, and mobile core networks 140 are depicted in FIG. 1, one of skill in the art will recognize that any number of remote units 105, access networks 120, base units 110, wireless communication links 115, and mobile core networks 140 may be included in the wireless communication system 100. In another embodiment, the access network 120 contains one or more WLAN (e.g., Wi-Fi™) access points.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

In some embodiments, the remote units 105 may communicate with a remote server, such as the application server ("AS") 151, via a data path 125 that passes through the mobile core network 140 and a data network 150. For example, a remote unit 105 may establish a PDU connection (or a data connection) to the data network 150 via the mobile core network 140 and the access network 120. The mobile core network 140 then relays traffic between the remote unit 105 and the AS 151 using the PDU connection to the data network 150. Note that an application 107 may communicate with the AS 151 using a PDU session, or similar data connection.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 140 via the access network 120. In one embodiment, the access network 120 is a 3GPP access network, such as 5G-RAN, E-UTRAN, or the like.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is the evolved packet core ("EPC") or a 5G core ("5GC"), which may be coupled to a data network 150, like the Internet and private data networks, among other data networks. Each mobile core network 140 belongs to a single public land mobile network ("PLMN"). The present disclosure is not intended to be limited to the implementation of any particular wireless communication system architecture or protocol.

The mobile core network 140 includes several network entities ("NFs"). As depicted, the mobile core network 140 includes a mobility management entity ("MME") 141, a serving gateway ("SGW") 143, a packet data network gateway ("PGW") 145, a home subscriber server ("HSS") 147, and an authentication, authorization, and accounting ("AAA") server 149.

Where implemented as a 5G core, the mobile core network 140 may include multiple control plane functions including, but not limited to, an Access and Mobility Management Function ("AMF"), a Session Management Function ("SMF"), and a Policy Control Function ("PCF"). Additionally, the mobile core network 140 includes a user plane function ("UPF") and a Unified Data Management ("UDM").

Although specific numbers and types of network functions are depicted in FIG. 1, one of skill in the art will recognize that any number and type of network functions may be included in the mobile core network 140. In some embodiments, the mobile core network 140 may include multiple network slices. In such embodiments, each slice may include one or more network functions ("NFs"), such as user plane functions ("UPF") and/or control plane functions, such as a SMFs and the like.

In some embodiments, a remote unit 105 may send autonomous uplink ("AUL") transmissions 130 to the access network 120 (e.g., to the base unit 110 in the access network 120). For example, the application 107 may generate data for AUL transmissions. Here, the remote unit 105 prepares a TB for the AUL data and sends the AUL TB during an AUL transmission opportunity (e.g., a subframe scheduled for AUL).

Figure 2:
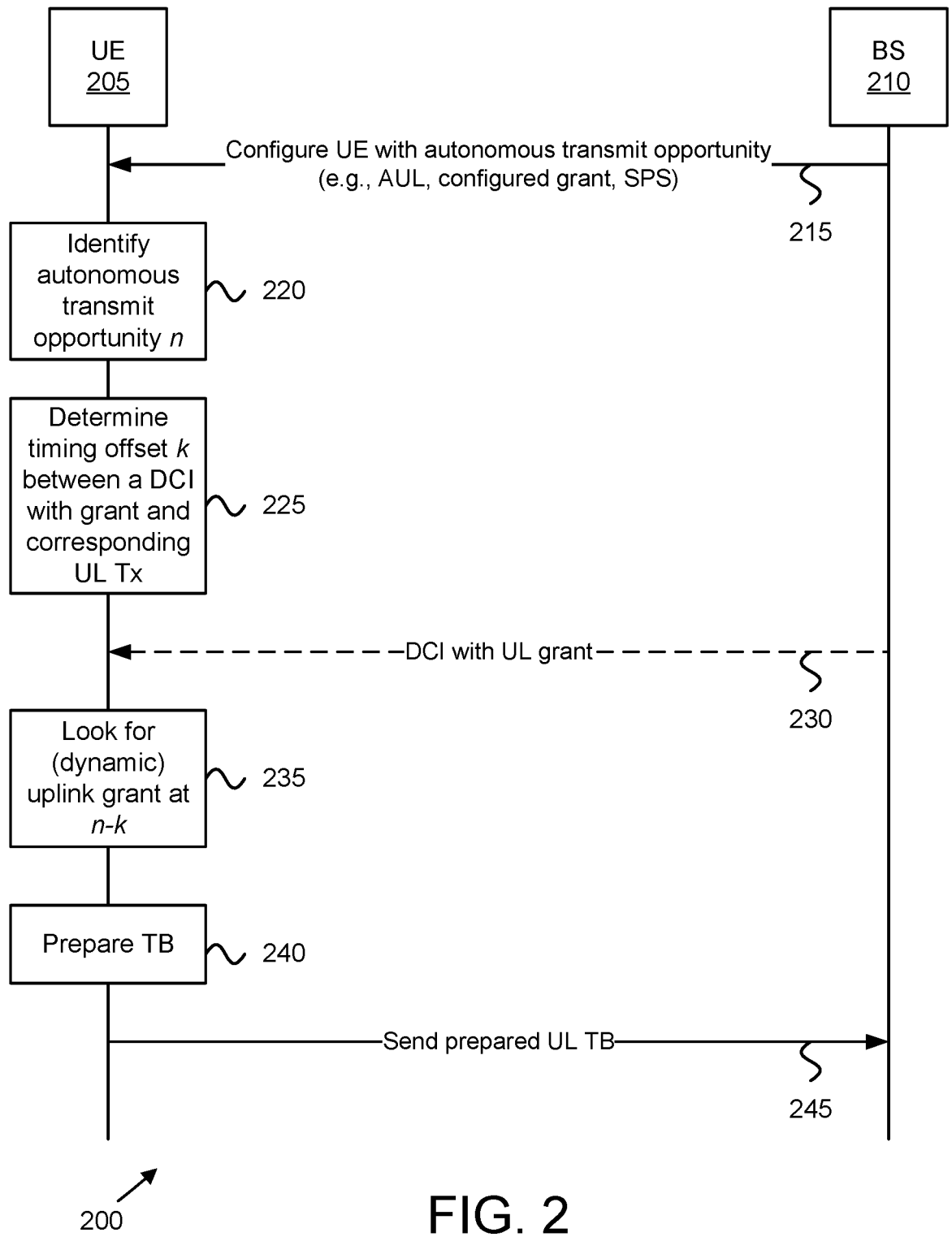
FIG. 2 is a schematic block diagram illustrating one embodiment of a network architecture that may be used for determining transport block generation timing of an uplink transmission.

FIG. 2 depicts a network architecture 200, according to embodiments of the disclosure. The network architecture 200 includes a UE 205 and a base station ("BS") 210. Here, the UE 205 may be one embodiment of the remote unit 105 and the BS 210 may be one embodiment of the base unit 110.

As depicted, the BS 210 configures the UE 205 with autonomous transmit opportunities, such as LTE AUL, configured grant (in 5G), or other semi-persistent scheduling (see messaging 215). The UE 205 identifies a next autonomous transmit opportunity n (see block 220). The UE 205 determines a timing offset k between a DCI with uplink grant (dynamic) and corresponding uplink transmission (see block 225).

In certain embodiments, the BS 210 sends DCI with UL grant prior to the next autonomous transmit opportunity n (see messaging 230). At (e.g., subframe) n−k the UE 205 looks for an uplink grant (e.g., determines whether the BS 210 sends a dynamic uplink grant, see block 235). The UE 205 prepares a TB (see block 240) and sends the prepared UL TB to the BS 210 (see messaging 245). If the BS 210 sends DCI with UL grant (refer to messaging 230), then the prepared TB may be for new data. Alternatively, the prepared TB may be for a retransmission.

Figure 3:
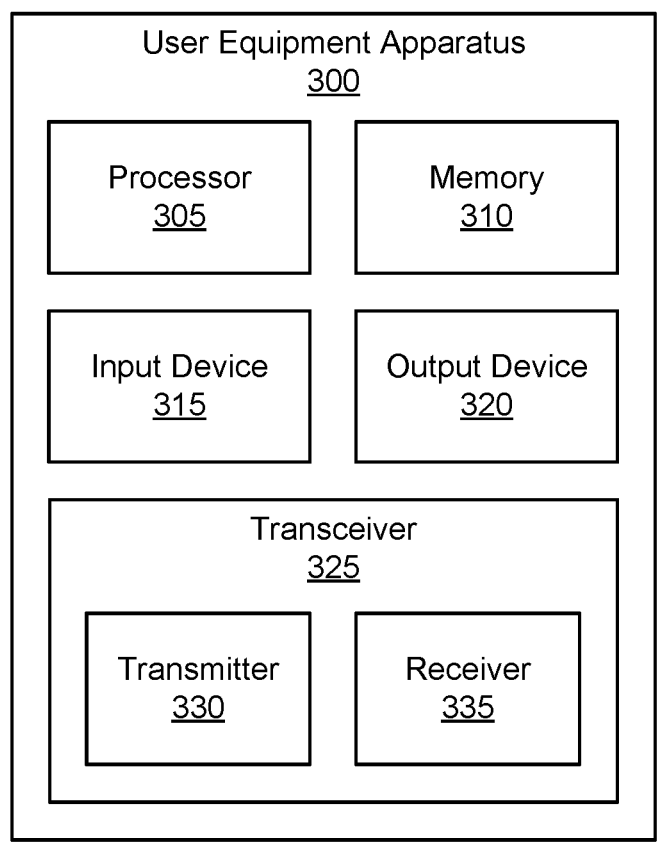
FIG. 3 is a schematic block diagram illustrating one embodiment of a user equipment apparatus that may be used for determining transport block generation timing of an uplink transmission.

FIG. 3 depicts one embodiment of a user equipment apparatus 300 that may be used for determining transport block generation timing of an uplink transmission. The user equipment apparatus 300 may be one embodiment of the remote unit 105. Furthermore, the user equipment apparatus 300 may include a processor 305, a memory 310, an input device 315, an output device 320, and a transceiver 325. In some embodiments, the input device 315 and the output device 320 are combined into a single device, such as a touchscreen. In certain embodiments, the user equipment apparatus 300 may not include any input device 315 and/or output device 320. In various embodiments, the user equipment apparatus 300 may include one or more of the processor 305, the memory 310, and the transceiver 325, and may not include the input device 315 and/or the output device 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In various embodiments, the processor 305 identifies a transmit opportunity n for uplink transmission and identifies a timing offset k between reception of an uplink grant and an uplink transmission corresponding to the uplink grant. The processor 305 prepares a TB for uplink transmission, wherein preparing the TB occurs after completing detection of uplink grants in a transmit opportunity n–k. The transceiver 325 transmits the prepared TB to a mobile communication network (e.g., to a base station in the mobile communication network), e.g., in transmit opportunity n (assuming the channel is not busy).

In some embodiments, the transmission in transmit opportunity n corresponds to one of a configured grant, a semi-persistently scheduled grant, and a dynamic grant. In some embodiments, the transmit opportunity n is a subframe for autonomous uplink ("AUL") transmission. In such embodiments, transmitting the prepared TB comprises transmitting an AUL transmission. Here, transmitting the AUL transmission may include the transmitter further transmitting UCI corresponding to the TB, the UCI comprising a HARQ process identifier and a NDI. Moreover, the processor 305 identifies a reference NDI for the HARQ process identifier and determines whether the prepared TB is a retransmission of a latest TB for the HARQ process. Here, the reference NDI is a latest communicated NDI for the indicated HARQ process. Additionally, the NDI in the UCI is not toggled compared to the reference NDI in response to the TB being a retransmission of a latest TB for the HARQ process and the NDI in the UCI is toggled compared to the reference NDI in response to the TB not being a retransmission of a latest TB for the HARQ process.

In some embodiments, the transceiver 325 further receives an uplink grant in the transmit opportunity n–k, the uplink grant comprising a HARQ process identifier and a NDI. In such embodiments, the HARQ process identifier indicates a HARQ process eligible for autonomous uplink transmissions. In certain embodiments, the processor 305 further identifies a reference NDI for the HARQ process identifier and compares the uplink NDI to the reference NDI. Here, the reference NDI is a latest communicated NDI for the indicated HARQ process. Additionally, preparing the TB comprises the processor 305 preparing a retransmission of a latest TB for the HARQ process in response to the uplink grant NDI having a same value as the reference NDI and preparing a new TB for the HARQ process in response to the uplink grant NDI having a different value than the reference NDI.

In some embodiments, the timing offset k is a fixed value. In some embodiments, the timing offset k is based on a capability of the user equipment apparatus 300. In some embodiments, the timing offset k is a dynamic value indicated via uplink grant, wherein preparing the TB further occurs after completing detection of uplink grants in a transmit opportunity n–$k_{min}$, where $k_{min}$ is a smallest offset that can be indicated by an uplink grant.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data related to UCI in autonomous uplink transmissions. For example, the memory 310 may store one or more network identifiers (e.g., RNTIs) assigned to the user equipment apparatus 300. Additionally, the memory 310 may store data for transmitting AUL transmissions, determining a timing offset, and the like. In certain embodiments, the memory 310 also stores program code and related data, such as an operating system or other controller algorithms operating on the remote unit 105.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, is designed to output visual, audible, and/or haptic signals. In some embodiments, the output device 320 includes an electronically controllable display or display device capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display separate from, but communicatively coupled to, the rest of the user equipment apparatus 300, such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, the output device 320 may be located near the input device 315.

The transceiver 325 includes at least transmitter 330 and at least one receiver 335. One or more transmitters 330 may be used to provide UL communication signals to a base unit 110, such as the AUL transmissions described herein. Similarly, one or more receivers 335 may be used to receive DL communication signals from the base unit 110, as described herein. Although only one transmitter 330 and one receiver 335 are illustrated, the user equipment apparatus 300 may have any suitable number of transmitters 330 and receivers 335. Further, the transmitter(s) 325 and the receiver(s) 330 may be any suitable type of transmitters and receivers. In one embodiment, the transceiver 325 includes a first transmitter/receiver pair used to communicate with a mobile communication network over licensed radio spectrum and a second transmitter/receiver pair used to communicate with a mobile communication network over unlicensed radio spectrum.

In autonomous uplink ("AUL") transmissions, a UE (e.g., the remote unit 105 and/or user equipment apparatus 300) only receives a DCI to enable/disable AUL. That DCI includes parameters for the uplink transmissions such as the resource block assignment ("RBA") and MCS. Any AUL transmissions are then done without new DCI whenever the UE can access the channel and has data in its transmit buffer. The physical resources for UCI transmissions preferably follow the mapping of CQI/PMI on the PUSCH resource elements Additionally, RRC signaling is used to configure how many (and which) UL HARQ processes are allowed for AUL transmission(s). The AUL supports transmissions of a new transport block as well as retransmissions. At the same time, the eNB (e.g., the base unit 110) is generally not necessarily aware which UE is transmitting a given AUL transmission.

Because the AUL transmission is grant-free, there is no eNB signalling to determine neither the HARQ ID, nor the NDI, nor the RV of the PUSCH data. Therefore, the UE includes UCI in the AUL transmission to inform the eNB of the corresponding transmission parameters.

Figure 4:
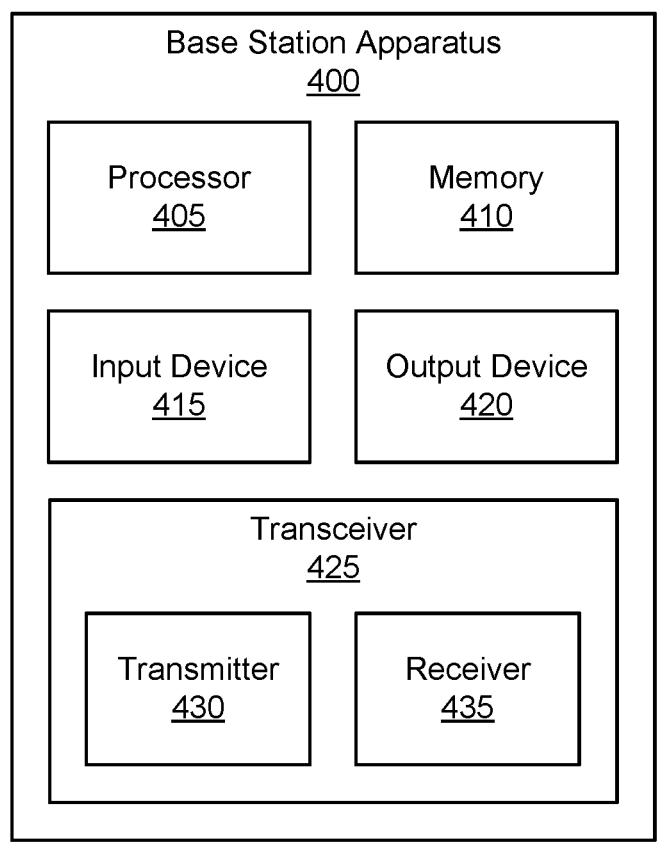
FIG. 4 is a schematic block diagram illustrating one embodiment of a base station apparatus that may be used for determining transport block generation timing of an uplink transmission.

FIG. 4 depicts one embodiment of a base station apparatus 400 that may be used for determining transport block generation timing of an uplink transmission. The base station apparatus 400 may be one embodiment of the remote unit 105. Furthermore, the base station apparatus 400 may include a processor 405, a memory 410, an input device 415, an output device 420, and a transceiver 425. In some embodiments, the input device 415 and the output device 420 are combined into a single device, such as a touchscreen. In certain embodiments, the base station apparatus 400 may not include any input device 415 and/or output device 420. In various embodiments, the base station apparatus 400 may include one or more of the processor 405, the memory 410, and the transceiver 425, and may not include the input device 415 and/or the output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In some embodiments, the processor 405 is configured to send (e.g., via the transceiver 425) a control signal to a UE (e.g., a remote unit 105) to enable autonomous uplink ("AUL") transmission at the UE. For example, the processor 405 may control the transceiver 425 to send DCI to enable/disable AUL. That DCI may include parameters for the uplink transmissions such as the RBA and MCS. In certain embodiments, the processor 405 configures the UE for AUL transmission, for example via RRC signaling.

Thereafter, the transceiver 425 may receive an AUL transmission from the UE. Here, the AUL transmission may include a prepared TB. As discussed herein, the UE waits as long as possible to prepare the TB.

In certain embodiments, the processor 405 controls the transceiver 425 to send a timing offset k to the UE. In certain embodiments, the processor 405 controls the transceiver 425 to send DCI including an uplink grant to the UE. Here, the transceiver 425 sends the uplink grant not later than n–k subframes (or other transmit opportunities) before a subframe n which is the next AUL transmission for the UE.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to UCI in autonomous uplink transmissions. For example, the memory 410 may store one or more network identifiers (e.g., RNTIs) assigned to the base station apparatus 400. Additionally, the memory 410 may store data for transmitting via AUL transmissions, UCI, CRC parity bits for the UCI, and the like. In certain embodiments, the memory 410 also stores program code and related data, such as an operating system or other controller algorithms operating on the remote unit 105.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the base station apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 includes at least transmitter 430 and at least one receiver 435. One or more transmitters 430 may be used to provide DL communication signals to a remote unit 105, such as DCI. Similarly, one or more receivers 435 may be used to receive UL communication signals from the remote unit, such as AUL transmissions accompanied by UCI, as described herein. Although only one transmitter 430 and one receiver 435 are illustrated, the base station apparatus 400 may have any suitable number of transmitters 430 and receivers 435. Further, the transmitter(s) 425 and the receiver(s) 430 may be any suitable type of transmitters and receivers.

FIG. 5-9 depict various example scenarios of TB generation timing, according to embodiments of the disclosure. FIGS. 5-9 involve the UE 205 and an eNB 505. It is presumed that the eNB 505 has configured the UE 205 for AUL transmissions and enables the AUL transmissions (e.g., via an activation message in DCI). The UE 205 sends AUL TBs during a first set of AUL subframes 510 (see PUSCH transmission 520).

Figure 5:
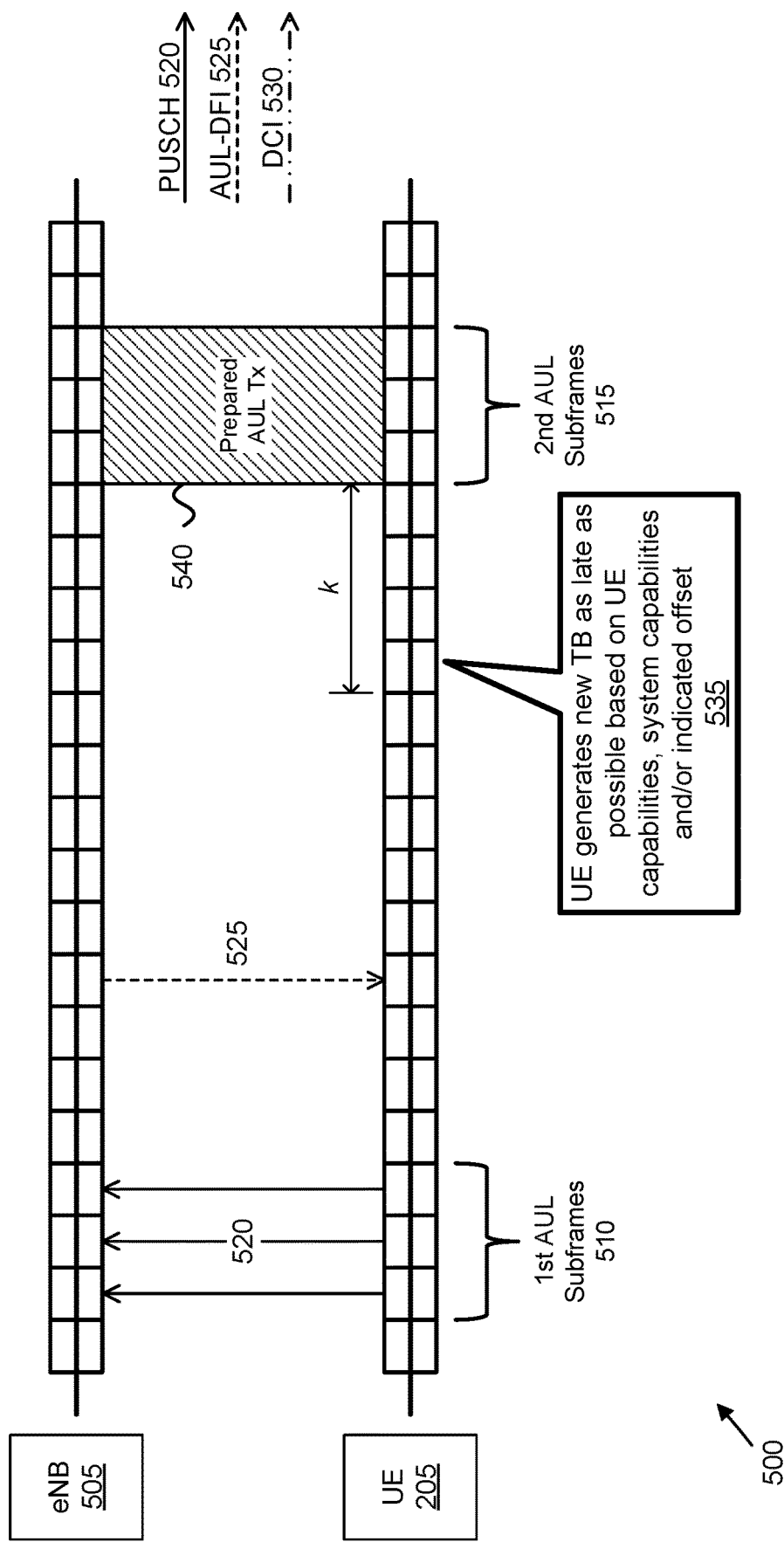
FIG. 5 is a block diagram illustrating a first embodiment of determining transport block generation timing of an uplink transmission.

FIG. 5 depicts a first scenario 500 where the RRC configuration of the UE 205 allows only specific subframes (or TTIs) for AUL transmissions. Here, the second set of AUL transmission subframes 515 occur at a much later time than reception of the AUL-DFI 525. Note that the UE 205 is not able to perform AUL transmissions at any desired time; rather, it is permitted to perform AUL transmissions only during the specific subframes, the next AUL opportunity being the second set of AUL subframes 515.

As discussed above, the UE 205 does not immediately generate an AUL TB in response to the AUL-DFI 525. Rather, the UE 205 "postpones" generation of the TB. In various embodiments, the UE 205 delays generation of the new TB for as long as possible based on the UE capabilities, UE configuration, system capabilities, and/or an offset indicated by the eNB 505. In some embodiments, the UE 205 calculates an offset k and prepares an AUL TB to be sent at subframe n beginning at time n−k. Note that this assumes that subframe n is configured for AUL transmission by the UE 205. Moreover, the UE 205 sends the prepared AUL TB (e.g., on PUSCH) during the second set of AUL subframes 515 (see block 540). Note that there is no conflicting dynamic grant of UL resources in the first scenario 500, nor is there any impediment to transmitting during the second set of AUL subframes 515.

Figure 6:
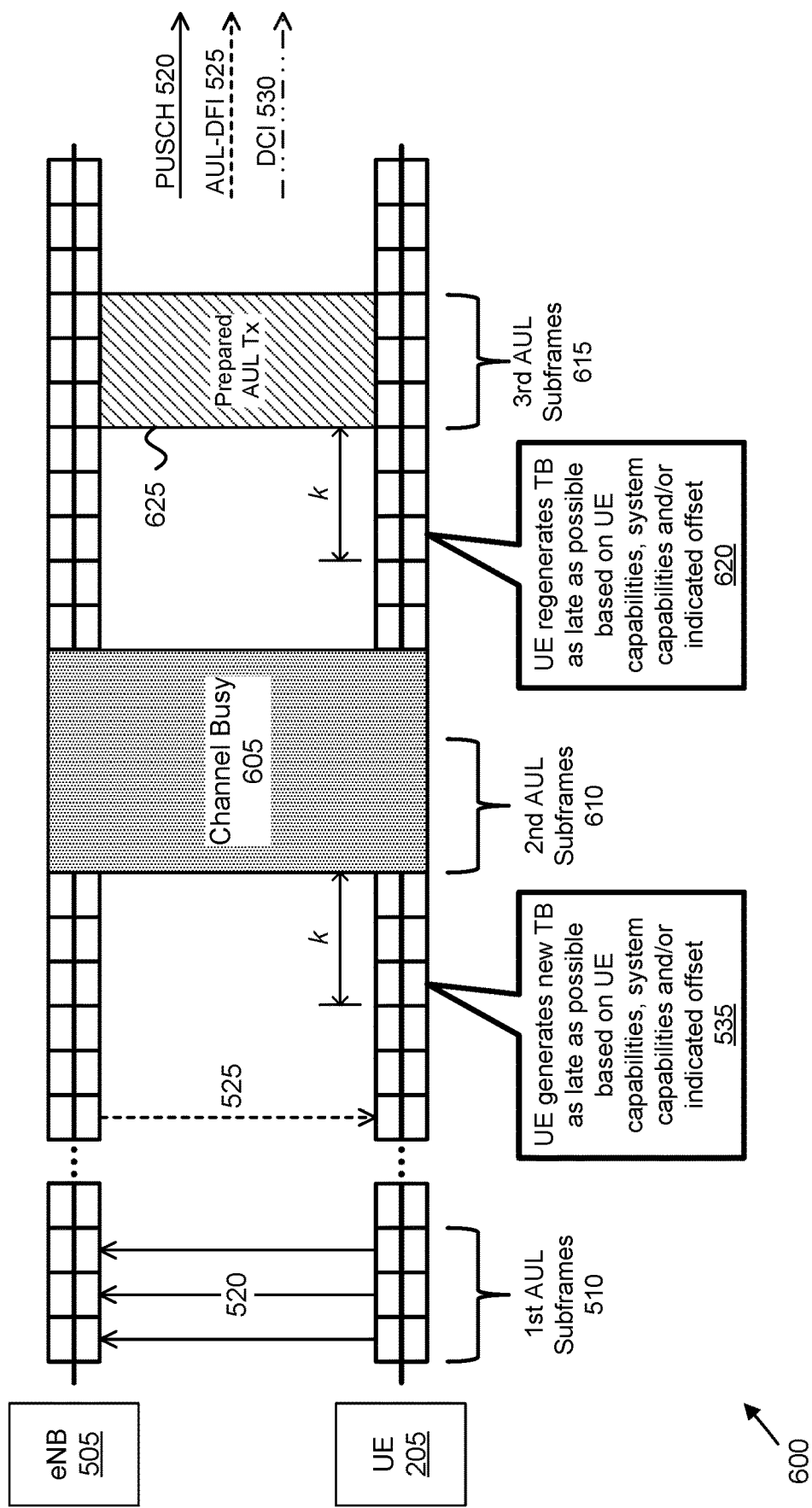
FIG. 6 is a block diagram illustrating a second embodiment of determining transport block generation timing of an uplink transmission.

FIG. 6 depicts a second scenario 600 for determining transport block generation timing of an uplink transmission, according to embodiments of the disclosure. Here, the medium (e.g., LAA/eLAA channel) is busy at the time of the second AUL subframes 610 so that a clear channel assessment ("CCA") fails. In various embodiments, CCA failure is indicated by energy-detection ("ED") above a given threshold value on the medium in a listen-before-talk ("LBT") approach. Due to the channel busy condition 605, the UE 205 is unable to transmit during the second AUL subframes 610. However, the UE 205 needs to prepare the TB ahead of time, not knowing whether the channel will be busy or not. Accordingly, at block 535 the UE 205 generates a new TB (e.g. for second AUL subframes 610). As described above, the UE 205 may determine an offset k and prepare the TB k subframes prior to the start of the second AUL subframes 610.

In one embodiment, if the channel is busy during the second AUL subframes 610, the UE 205 may then return the TB and regenerates a new TB a later time (e.g., prior to a next uplink transmission opportunity). Beneficially, TB regeneration avoids data padding. Again, the UE 205 waits as long as possible (e.g., until k subframes prior the next AUL transmit opportunity) before generating the new TB (see block 620). However, some UEs may not be configured with a mechanism to 'return' a packet. In such embodiments, the UE 205 does not regenerate the TB and instead waits for the next uplink transmission opportunity (here, third set of AUL subframes 615) to transmit the previously prepared TB (e.g. prepared in block 535). Upon determining that the channel is not busy during the third set of AUL subframes 615, the UE 205 transmits the prepared AUL transmission (e.g., the regenerate TB or previously generated TB).

Note that the scenarios of FIGS. 5 and 6 may occur independently of each other. For example, the channel may be detected as non-busy in subframes that are not eligible for AUL transmissions, or the channel may be detected as busy (state 605) in subframes 610 that are eligible for AUL transmissions. In both these cases, the UE 205 has to delay the AUL transmission to a later subframe that is both eligible for AUL transmission and where the medium has been detected as non-busy (see prepared AUL transmission 540, 625).

In some embodiments, there is a fixed time offset k between the reception of an uplink grant in subframe n−k and the corresponding uplink transmission in subframe n. Here, the eNB 505 may indicate this offset to the UE 205. In such embodiments, the UE 205 first completes the detection process of received uplink grants in subframe n−k before preparing a transport block for AUL transmission 540 in subframe n.

As discussed above, the eNB 505 may send an uplink grant (e.g., in DCI 530) for any subframe and HARQ process. As a consequence, it may happen that the eNB 505 transmits an uplink grant (e.g., a dynamic grant) indicating the transmission of a new transport block using a HARQ process, where the most recent transmission for the HARQ process was an AUL transmission (or retransmission) 520 sent during the first set of AUL subframes 510. Such a situation may be desirable specifically if the most recent AUL transmission (or retransmission) 520 was received successfully (which would result as an ACK to be delivered by the AUL-DFI 525), so that the associated HARQ process may be used for the transmission of a new transport block, e.g., by creating a new transport block in the MAC layer and handing the same down to the physical layer for the transmission procedure. However, the uplink grant may also occur if the eNB 505 received the most recent AUL transmission (or retransmission) correctly, but the AUL-DFI 525 was corrupted by noise or interference or could not be delivered in time e.g. due to scheduling constrains or a busy unlicensed medium.

In some embodiments, the transmit buffer of the UE 205 holds less data than the transport block size that can be conveyed in an AUL transmission. In such embodiments, the UE 205 adds padding data to the transport block in the MAC layer (e.g., MAC PDU) so that the resulting transport block size matches the expected size (e.g., the TBS determined according to the AUL RRC configuration and the AUL activation DCI). Note that the padding implies a certain inefficiency of the transmission, as the padding data will be discarded at the receiver.

Figure 7:
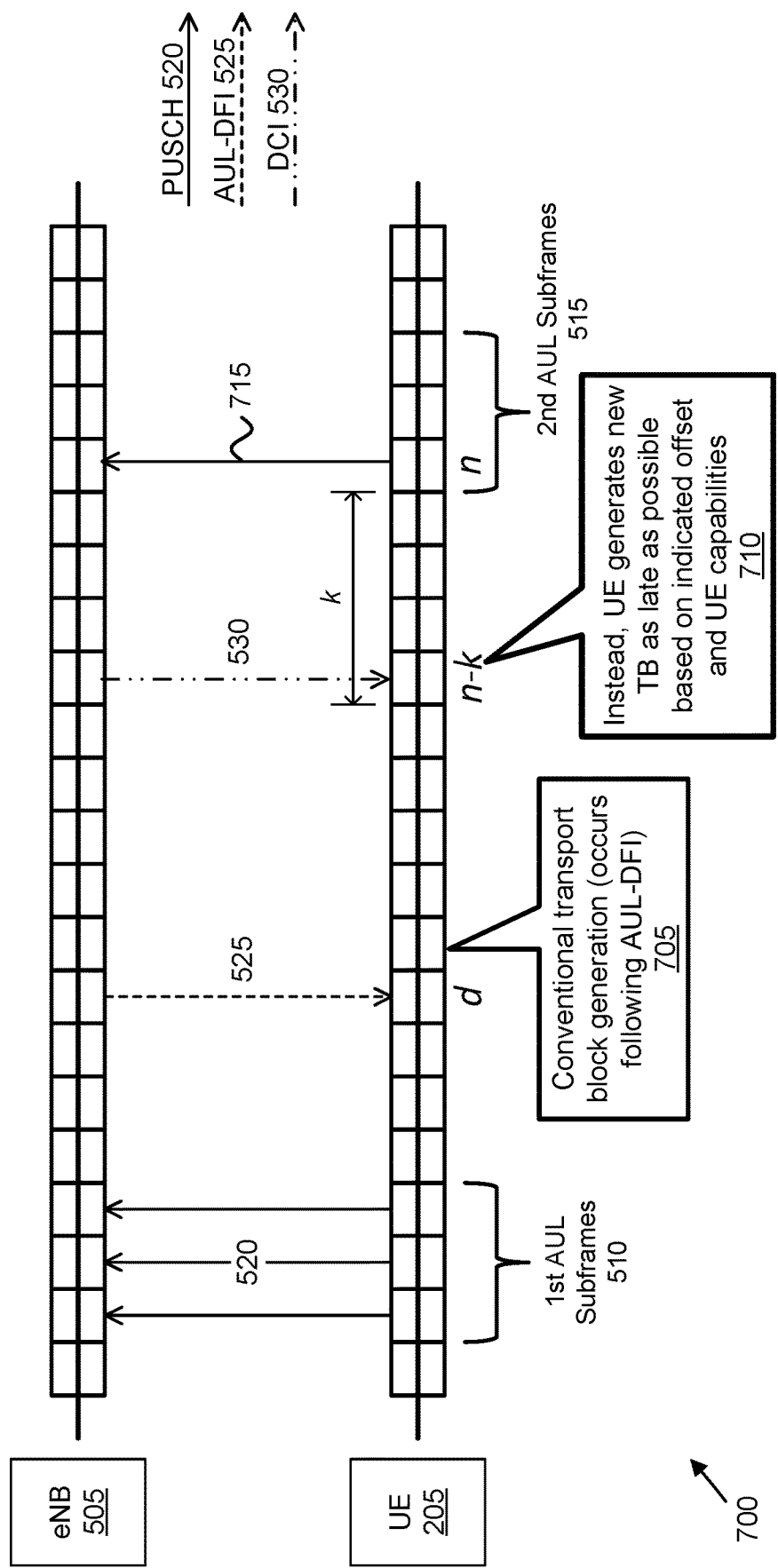
FIG. 7 is a block diagram illustrating a third embodiment of determining transport block generation timing of an uplink transmission.

FIG. 7 depicts a third scenario 700 for determining transport block generation timing of an uplink transmission, according to embodiments of the disclosure. Here, the UE 205 receives AUL-DFI 525 in subframe d. Conventionally, the MAC layer creates the new transport block upon reception of an ACK in the AUL-DFI 525 (see block 705). In some embodiments, the MAC layer in the UE 205 creates the new transport block at a defined number of subframes k prior to the next potential AUL transmission subframe 515 (e.g., in subframe n). In other embodiments, the MAC layer creates the new transport block at a time between those two instances (between subframe d and subframe n−k). However, the uncertainty as to when to generate the new transport block may lead to a problem in case that the UE 205 has already created a new transport block prior to receiving an uplink grant (e.g., DCI 530).

To remedy the above noted uncertainties, the UE 205 forms the AUL transport block at a time selected to minimize padding in the TB. This TB generation time is beneficially identical to the time when the MAC layer in the UE 205 would form a transport block for a dynamically granted (scheduled) uplink transmission. In a variant, this TB generation time is the latest possible time at which the UE 205 is able to process a dynamic uplink grant for a scheduled transmission in subframe n.

In some embodiments, there is a fixed time offset k between the reception of an uplink grant in subframe n−k and the corresponding uplink transmission in subframe n (e.g., one of the AUL subframes 515). In such embodiments, the UE 205 first completes the detection process of received uplink grants in subframe n−k before generating a transport block for AUL transmission in subframe n.

In some embodiments, the offset k is indicated in an uplink grant, instead of being a fixed value. This may be the case, for example, in uplink grants according to DCI formats 0A, 0B, 4A, 4B. In such embodiments, the UE 205 does not generate a transport block for AUL transmission until it has completed the detection process of received uplink grants in subframe n−$k_{min}$, where $k_{min}$ is the smallest offset that can be indicated by an uplink grant.

In certain embodiments, the smallest offset $k_{min}$ may be further limited by the UE processing capability. For example, some UEs 205 may be capable of supporting $k_{cap}>=3$ while other UEs 205 may be capable of supporting only $k_{cap}>=4$. Therefore, the UE 205 shall not generate a transport block for AUL transmission before it has completed the detection process of received uplink grants in subframe n−$k_{det}$, where $k_{det}$ is determined as the maximum of $\{k_{min}, k_{cap}\}$.

Accordingly, the UE 205 generates the new TB as late as possible based on an indicated offset (e.g., k or $k_{min}$) and further based on the capabilities (e.g., processing capability) of the UE 205 (see block 710). Beneficially, this minimizes padding for AUL transmissions because all data that is available in time to generate a transport block will be included in the transport block. Minimizing padding also improves latency delay for data arriving in the transmit buffer from higher later, e.g., the RLC layer. Moreover, setting transport block generation timing to minimize padding also ensures that the transport block for AUL transmission is generated only after it has become clear that the UE 205 has not received a scheduling grant (e.g., dynamic uplink grant) for transmission in subframe n. Because DCI scheduling a dynamic uplink grant was received (e.g., at subframe n−k) the UE 205 prepares and transmits a TB with uplink data corresponding to the dynamic grant (see transmission 715). Note that transmission of AUL data may be deferred until a next AUL transmission opportunity.

Figure 8:
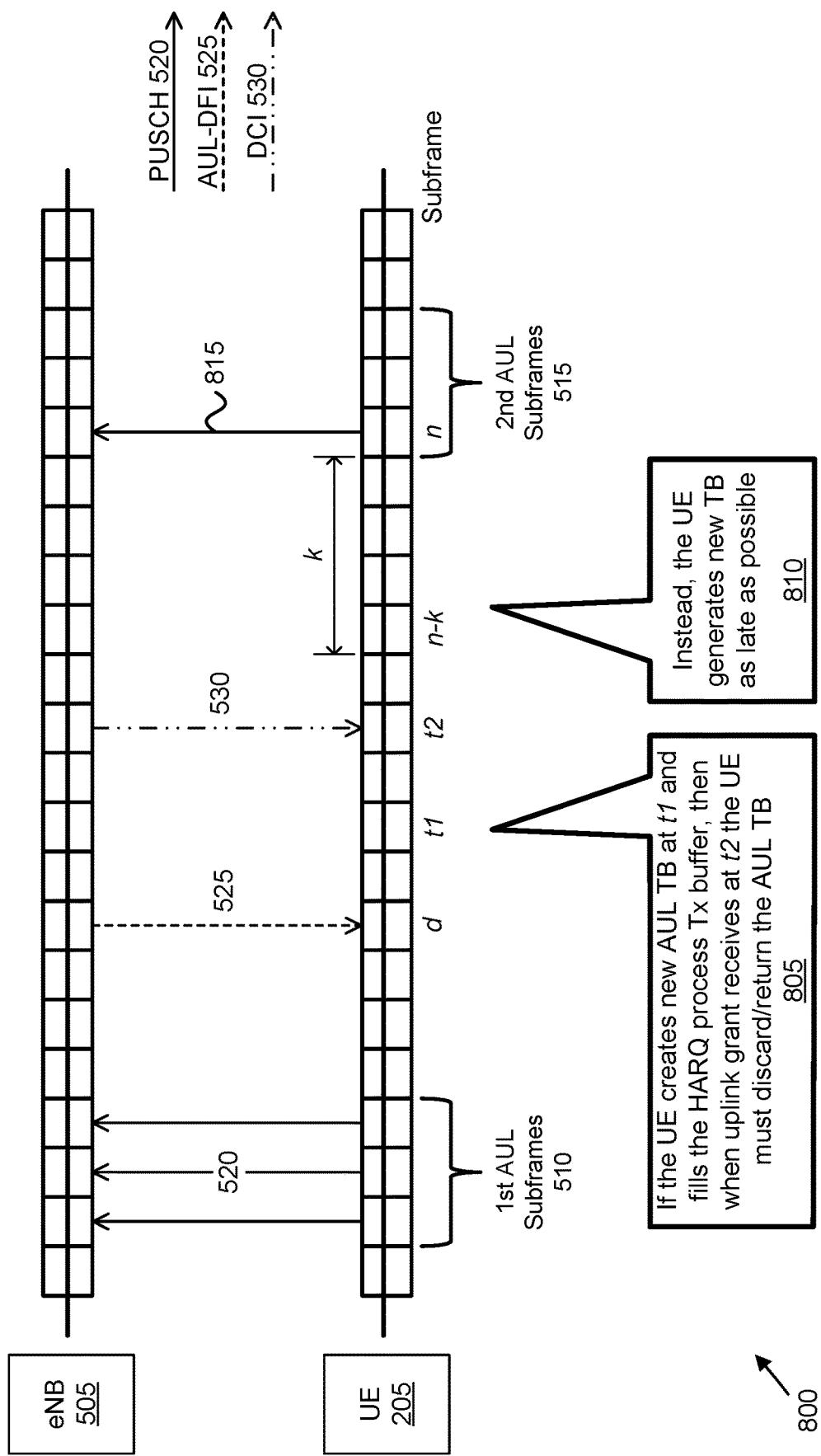
FIG. 8 is a block diagram illustrating a fourth embodiment of determining transport block generation timing of an uplink transmission.

FIG. 8 depicts a fourth scenario 800 for determining transport block generation timing of an uplink transmission, according to embodiments of the disclosure. Here, the UE 205 receives AUL-DFI 525 in subframe d. If the UE creates a new transport block for an AUL transmission in subframe n shortly after receiving the AUL-DFI 525 (e.g., generates the in subframe t1, see block 805) and consequently fills the corresponding HARQ process transmission buffer, then when the UE 205 receives a (dynamic) grant (via DCI 530) in subframe t2 requesting a new transport block for that HARQ process for transmission in subframe n, the UE 205 must discard the AUL TB to follow the dynamic grant.

In general, the AUL transport block generated in subframe t1 will have a different size (and possibly other different transmission parameters) compared to the transport block that would need to be generated as a consequence of the grant received in subframe t2. Moreover, the eNB 505 may expect the UE 205 to follow the grant (e.g., the dynamic grant has priority over the semi-persistently scheduled grant). Consequently, the UE 205 needs to discard the transport block that was generated in subframe t1 (or return it to the MAC) in order to obtain a transport block that complies with the uplink grant received in subframe t2. Clearly, discarding or returning a transport block implies unnecessary operations, resulting in wasted processing time and power.

To remedy the above noted unnecessary operations (e.g., discarding a prematurely formed AUL TB), the UE 205 instead waits as long as possible to form the AUL transport block (see block 810). As depicted, the UE 205 forms the AUL transport block at a time when the UE's MAC layer would form a transport block for a granted (scheduled) uplink transmission. In a variant, this time is the latest possible time at which the UE would have been able to process an uplink grant for a scheduled transmission in subframe n (e.g., a time corresponding to subframe n−k). Beneficially, this minimizes padding for AUL transmissions because all data that is available in time to generate a transport block will be included in the transport block. Moreover, setting transport block generation timing to minimize padding also ensures that the transport block for AUL transmission is generated only after it has become clear that the UE 205 has not received a scheduling grant (e.g., dynamic uplink grant) for transmission in subframe n. Because DCI scheduling a dynamic uplink grant was received (e.g., at subframe t2) the UE 205 prepares and transmits a TB with uplink data corresponding to the dynamic grant (see messaging 815). Note that transmission of AUL data may be deferred until a next AUL transmission opportunity.

Figure 9:
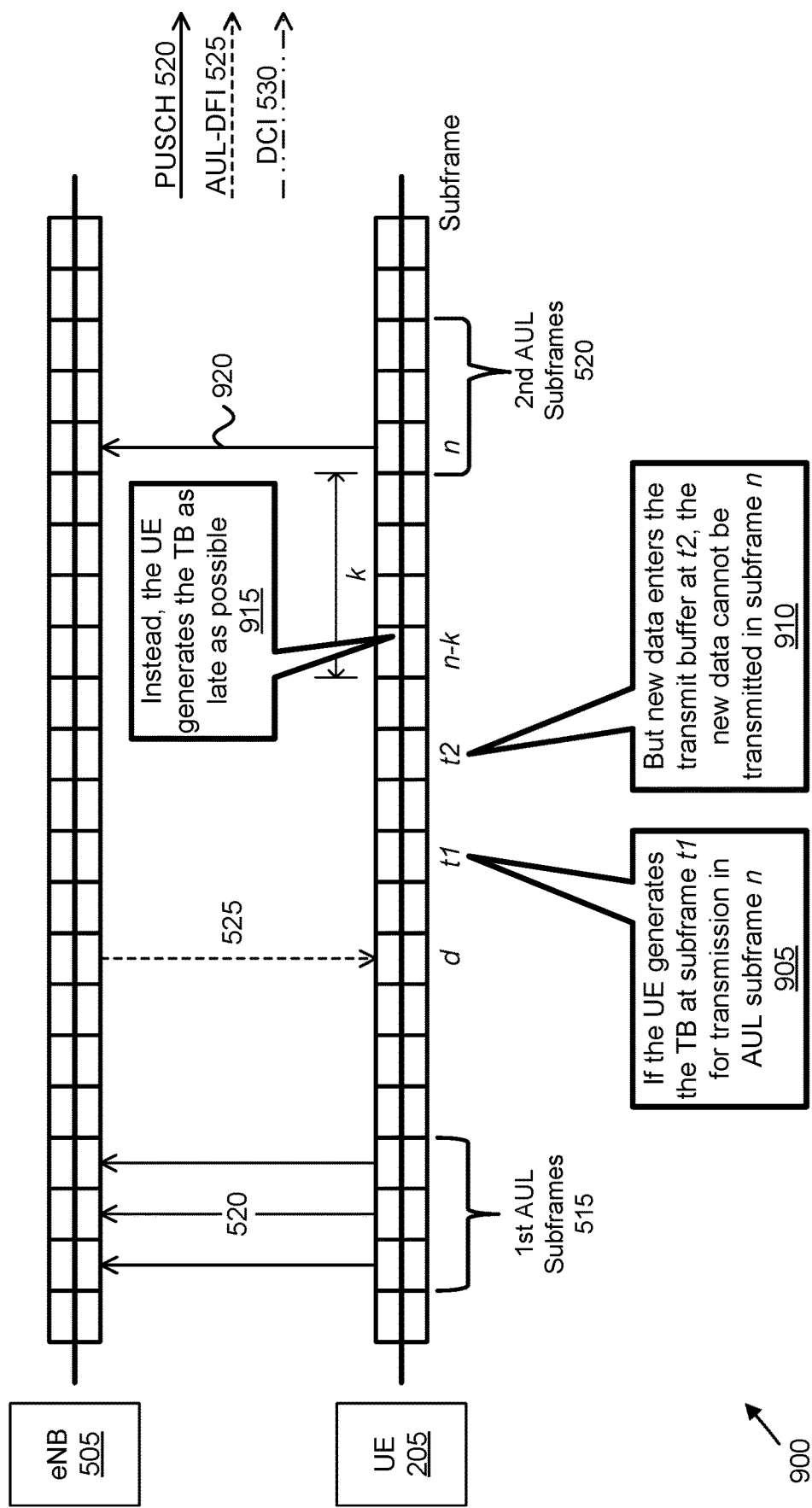
FIG. 9 is a block diagram illustrating a fifth embodiment of determining transport block generation timing of an uplink transmission.

FIG. 9 depicts a fourth scenario 900 for determining transport block generation timing of an uplink transmission, according to embodiments of the disclosure. In the fourth scenario 900, the MAC layer at the UE 205 receives AUL-DFI 525 in subframe d. If the UE 205 creates a new transport block for AUL transmission (e.g., to send in subframe n) shortly after receiving the AUL-DFI 525 (e.g., generates the new TB in subframe t1, see block 905) and then the UE 205, specifically the transmit buffer, receives data in subframe t2 (e.g., from the RLC layer) after the transport block has been formed in subframe t1, but before subframe n−k (e.g., the predefined number of subframes prior to the next potential AUL transmission subframe n), then the new data cannot be transmitted in subframe n due to the AUL TB already being formed (see block 910).

Moreover, it may require too much processing for the UE 205 to return and regenerate a larger transport block in time to transmit the data in subframe n. Consequently, the UE 205 may need to add padding data to the already formed transport block in order to match the expected transport block size, even though meaningful data is in the transmit buffer at the time of the corresponding AUL transmission. In this scenario, there is not only an inefficiency as a result of including padding data, but in addition there is an unnecessary delay for the newly arrived data that needs to wait for another transmission opportunity in a subframe that occurs potentially much later than in subframe n.

To remedy the above noted unnecessary operations (e.g., discarding a prematurely formed AUL TB), the UE 205 forms the AUL transport block at the latest possible time at which the UE would have been able to process an uplink grant for a scheduled transmission in subframe n (see block 920). In a variant, this time is the time when the UE's MAC layer would form a transport block for a granted (scheduled) uplink transmission. As noted above, such timing also minimizes padding in the TB, thus improving data throughput. Because no DCI scheduling a dynamic uplink grant was received, the UE 205 prepares and transmits a TB with AUL data during subframe n (see PUSCH transmission 920 containing the AUL TB generated as late as possible).

The above methodologies are also applicable when determining at what time (subframe) the MAC layer forms a transport block for scheduled transmissions and hands it to the physical layer—or alternatively/equivalently, determining at what time (subframe) the physical layer requests a new transport block for scheduled transmissions from the MAC layer.

For example, where the uplink grant includes an indication of the offset k, if the UE 205 generates the transport block immediately upon reception of the uplink grant, then is it likely that the transport block includes unnecessary padding data. Therefore, the UE 205 generates the transport block as late as possible to wait if additional data becomes available, e.g., from an RLC layer. Specifically, where the UE 205 receives an uplink grant where a subframe offset k is indicated in the grant, then UE 205 does not generate a transport block for AUL transmission before it has completed the detection process of received uplink grants in subframe $n-k_{det}$, where $k_{det}$ is determined as the maximum of $\{k_{min}, k_{cap}\}$, as discussed above.

In some embodiments, the UE 205 receives a two-stage grant, as the first stage (trigger A), equivalent to one of DCI formats 0A, 0B, 4A, 4B, contains a first non-negative offset and the second stage (trigger B) contains a second non-negative offset. Here, the overall minimum offset cannot be smaller than the minimum offset $k_{min}$ that can be indicated by the trigger A grant. In one embodiment, the offset $k_{min}$ is made equivalent to a configurable parameter $k_{min,conf}$ that can be conveyed by RRC (e.g., along with the AUL RRC configuration parameters, or with the AUL activation DCI). Here, the parameter $k_{min,conf}$ should not exceed the UE's processing capability (e.g., $k_{min,conf} \geq k_{cap}$). If the configured parameter $k_{min,conf}$ is larger than the minimum offset of which the UE 205 is capable ($k_{cap}$), this leaves a bit more flexibility to the controller (e.g., processor 305) because an easier load balancing of all the tasks can be achieved. This can be enabled, for example, if the eNB 505 operates so that it will not indicate an offset smaller than $k_{min,conf}$ due to its own scheduling algorithm implementation/limitation.

In order to determine whether a scheduling grant received for a HARQ process configured as eligible for AUL transmissions is requesting 1) a retransmission of the latest transport block or 2) a transmission of a new transport block, the UE 205 compares the received NDI to a reference NDI. Here, the reference NDI is the latest NDI that has been transmitted (e.g., in the UCI accompanying the AUL PUSCH 520) or received (e.g., in the DCI scheduling the PUSCH transmission) at least m subframes prior to the reception of the scheduling grant in question. The value m is chosen as small as possible to minimize latency (and avoid unnecessary retransmission), but large enough to allow sufficient time for processing of a PUSCH transmission. In the LTE context, a value of m=4 is suitable to account for the UL HARQ timeline, but shorter values of m>=1 may be reasonable.

If the NDI in the grant is not toggled compared to the reference NDI related to that HARQ process (e.g., if the NDI bit values are the same), then the grant is requesting a retransmission of the latest transport block in that HARQ process. However, if the NDI in the grant is toggled compared to the reference NDI related to that HARQ process (e.g., if the NDI bit values are different), then the grant is requesting a transmission of a new transport block in that HARQ process.

The UE 205 determines the value of the NDI accompanying an AUL PUSCH transmission in similar manner. If the UE 205 is sending a retransmission of the latest transport block in that HARQ process, then the UE 205 does not toggle the NDI in the UCI as compared to the reference NDI related to that HARQ process. If the UE 205 is sending a transmission of a new transport block in that HARQ process, then the UE 205 toggles the NDI in the UCI as compared to the reference NDI related to that HARQ process.

Figure 10:
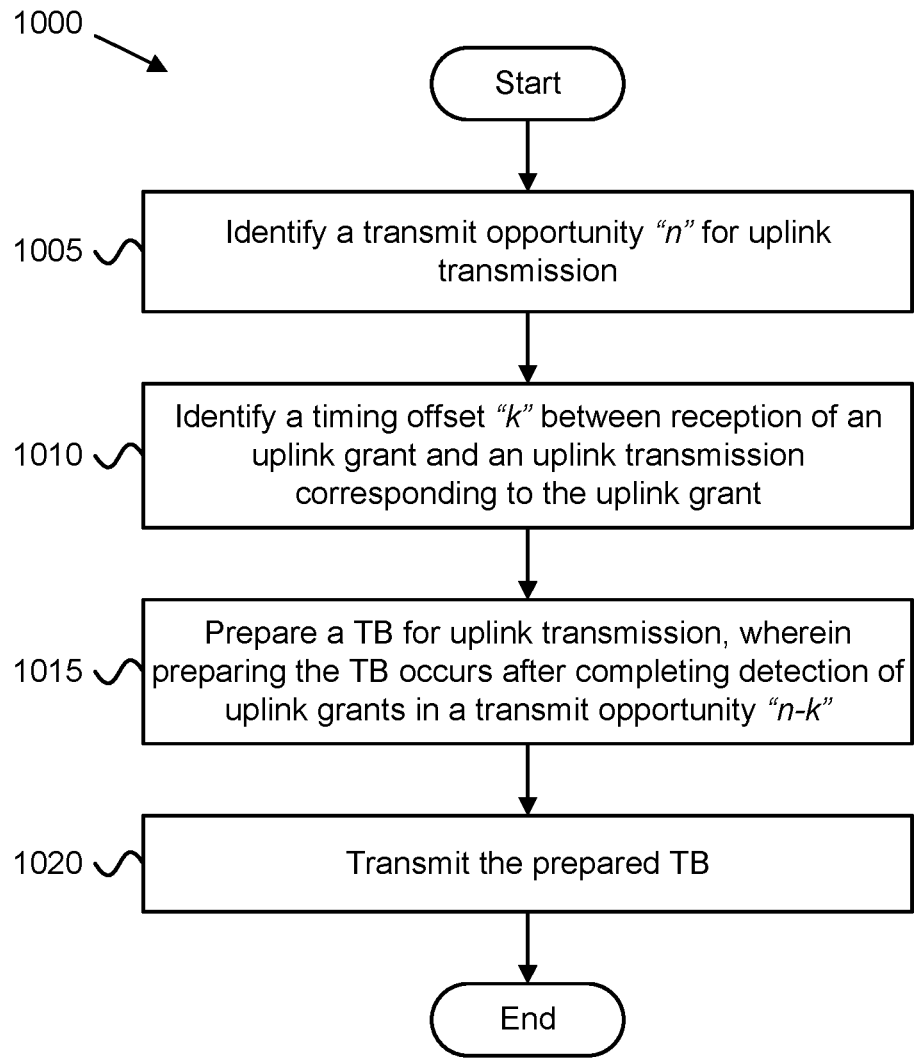
FIG. 10 is a flowchart diagram illustrating one embodiment of a method for determining transport block generation timing of an uplink transmission.

FIG. 10 depicts a method 1000 for determining transport block generation timing of an uplink transmission, according to embodiments of the disclosure. In some embodiments, the method 1000 is performed by an apparatus, such as the remote unit 105, the UE 205, and/or the user equipment apparatus 300. In certain embodiments, the method 1000 may be performed by a processor executing program code, for example, a microcontroller, a microprocessor, a CPU, a GPU, an auxiliary processing unit, a FPGA, or the like.

The method 1000 begins and identifies 1005 a transmit opportunity 'n' for uplink transmission. In certain embodiments, the transmit opportunity 'n' is a subframe for AUL transmission. In some embodiments, the transmit opportunity n is a subframe for autonomous uplink ("AUL") transmission.

The method 1000 includes identifying 1010 a timing offset 'k' between reception of an uplink grant and an uplink transmission corresponding to the uplink grant. In various embodiments, the offset 'k' is a fixed value. In other embodiments, the offset 'k' is dynamically indicated by the base unit (e.g., by the base unit 110, BS 210, base station apparatus 400, and/or eNB 505) via uplink grant. In certain embodiments, the timing offset 'k' is based on a capability of the apparatus.

The method 1000 includes preparing 1015 a TB for uplink transmission. Here, preparing 1015 the TB occurs after completing detection of uplink grants in a transmit opportunity (e.g., subframe) 'n-k'. Put another way, preparing 1015 the TB occurs after completing detection of uplink grants at a time prior to the transmit opportunity 'n' based on the offset 'k'. In one embodiment, the The method 1000 includes transmitting 1020 the prepared TB. The method 1000 ends. In various embodiments, transmission of the prepared TB occurs in transmit opportunity n. In one embodiment, the transmission in transmit opportunity n corresponds to one of: a configured grant, a semi-persistently scheduled grant, and a dynamic grant.

In some embodiments, transmitting the prepared TB includes transmitting an AUL transmission. In other embodiments, transmitting 1020 the prepared TB includes transmitting a TB in response to a dynamic uplink grant. In certain embodiments, transmitting 1020 the AUL transmission comprises transmitting UCI corresponding to the prepared TB, the UCI comprising a hybrid automatic repeat request ("HARQ") process identifier and a new data indicator ("NDI")

Disclosed herein is a first apparatus (e.g., a UE) for determining transport block generation timing of an uplink transmission. The first apparatus includes a processor and a transceiver. The processor identifies a transmit opportunity n for uplink transmission and identifies a timing offset k between reception of an uplink grant and an uplink transmission corresponding to the uplink grant. The processor prepares a TB for uplink transmission, wherein preparing the TB occurs after completing detection of uplink grants in a transmit opportunity n−k. The transceiver transmits the prepared TB to a mobile communication network (e.g., to a base station in the mobile communication network).

In some embodiments, the transmission in transmit opportunity n corresponds to one of a configured grant, a semi-persistently scheduled grant, and a dynamic grant. In some embodiments, the transmit opportunity n is a subframe for autonomous uplink ("AUL") transmission. In such embodiments, transmitting the prepared TB comprises transmitting an AUL transmission. Here, transmitting the AUL transmission may include the transmitter further transmitting UCI corresponding to the TB, the UCI comprising a HARQ process identifier and a NDI. Moreover, the processor identifies a reference NDI for the HARQ process identifier and determines whether the prepared TB is a retransmission of a latest TB for the HARQ process. Here, the reference NDI is a latest communicated NDI for the indicated HARQ process. Additionally, the NDI in the UCI is not toggled compared to the reference NDI in response to the TB being a retransmission of a latest TB for the HARQ process and the NDI in the UCI is toggled compared to the reference NDI in response to the TB not being a retransmission of a latest TB for the HARQ process.

In some embodiments, the transceiver further receives an uplink grant in the transmit opportunity n−k, the uplink grant comprising a HARQ process identifier and a NDI. In such embodiments, the HARQ process identifier indicates a HARQ process eligible for autonomous uplink transmissions. In certain embodiments, the processor further identifies a reference NDI for the HARQ process identifier and compares the uplink NDI to the reference NDI. Here, the reference NDI is a latest communicated NDI for the indicated HARQ process. Additionally, preparing the TB comprises the processor preparing a retransmission of a latest TB for the HARQ process in response to the uplink grant NDI having a same value as the reference NDI and preparing a new TB for the HARQ process in response to the uplink grant NDI having a different value than the reference NDI.

In some embodiments, the timing offset k is a fixed value. In some embodiments, the timing offset k is based on a capability of the apparatus. In some embodiments, the timing offset k is a dynamic value indicated via uplink grant, wherein preparing the TB further occurs after completing detection of uplink grants in a transmit opportunity n−$k_{min}$, where $k_{min}$ is a smallest offset that can be indicated by an uplink grant.

Disclosed herein is a first method (e.g., performed by a UE) for determining transport block generation timing of an uplink transmission. The first method includes identifying, at a remote unit, a transmit opportunity n for uplink transmission and identifying, at the remote unit, a timing offset k between reception of an uplink grant and an uplink transmission corresponding to the uplink grant. The first method includes preparing, at the remote unit, a TB for uplink transmission, wherein preparing the TB occurs after completing detection of uplink grants in a transmit opportunity n−k and transmitting the prepared TB.

In some embodiments, the transmission in transmit opportunity n corresponds to one of a configured grant, a semi-persistently scheduled grant, and a dynamic grant. In some embodiments, the transmit opportunity n is a subframe for autonomous uplink ("AUL") transmission. In such embodiments, transmitting the prepared TB comprises transmitting an AUL transmission. Here, transmitting the AUL transmission may include transmitting UCI corresponding to the TB, the UCI comprising a HARQ process identifier and a NDI. Moreover, the first method may include identifying a reference NDI for the HARQ process identifier and determining whether the prepared TB is a retransmission of a latest TB for the HARQ process. Here, the reference NDI is a latest communicated NDI for the indicated HARQ process. Additionally, the NDI in the UCI is not toggled compared to the reference NDI in response to the TB being a retransmission of a latest TB for the HARQ process and the NDI in the UCI is toggled compared to the reference NDI in response to the TB not being a retransmission of a latest TB for the HARQ process.

In some embodiments, the first method further includes receiving an uplink grant in the transmit opportunity n−k, the uplink grant comprising a HARQ process identifier and a NDI. In such embodiments, the HARQ process identifier indicates a HARQ process eligible for autonomous uplink transmissions. In certain embodiments, the first method further includes identifying a reference NDI for the HARQ process identifier and comparing the uplink NDI to the reference NDI. Here, the reference NDI is a latest communicated NDI for the indicated HARQ process. Additionally, preparing the TB may include preparing a retransmission of a latest TB for the HARQ process in response to the uplink grant NDI having a same value as the reference NDI and preparing a new TB for the HARQ process in response to the uplink grant NDI having a different value than the reference NDI.

In some embodiments, the timing offset k is a fixed value. In some embodiments, the timing offset k is based on a capability of the remote unit. In some embodiments, the timing offset k is a dynamic value indicated via uplink grant, wherein preparing the TB further occurs after completing detection of uplink grants in a transmit opportunity n−$k_{min}$, where $k_{min}$ is a smallest offset that can be indicated by an uplink grant.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   identifying, at a remote unit, a transmit opportunity n for autonomous uplink ("AUL") transmission, wherein the transmit opportunity n belongs to a semi-persistently scheduled uplink grant that is valid over multiple transmission opportunities, the AUL transmission being associated with a set of eligible Hybrid Automatic Repeat Request ("HARQ") processes;
   identifying, at the remote unit, a timing offset k between reception of an uplink grant and an uplink transmission corresponding to the uplink grant;
   receiving downlink feedback information ("DFI") for the AUL transmission comprising first uplink data;
   determining, at an expiration of a maximum amount of time after reception of the DFI, whether to one of re-transmit the first uplink data or transmit second uplink data in a transport block ("TB") during the transmit opportunity n, wherein:
said maximum amount of time is k units of time prior to the transmit opportunity n and defines a second transmit opportunity n−k, the k units of time define a minimal amount of time it takes to generate the TB, and the maximum amount of time also enables the TB to be generated as late as possible after receipt of the DFI and prior to the transmit opportunity n so that re-transmission of the first uplink data in the TB is not prematurely formed;
preparing, at the remote unit during the second transmit opportunity n−k, the TB for uplink transmission, wherein:
preparing the TB comprises generating a first TB that is a re-transmission of the first uplink data based on an indication in the DFI in response to no uplink grant for one or more HARQ processes from the set of eligible HARQ processes being received prior to the expiration of the maximum amount of time, and
in response to receiving the uplink grant for the one or more HARQ processes from the set of eligible HARQ processes prior to the expiration of the maximum amount of time, preparing the TB comprises generating a second TB including the second uplink data; and
transmitting one of the first TB and the second TB during the transmit opportunity n.

2. The method of claim 1, wherein transmitting the AUL transmission comprises transmitting uplink control information ("UCI") corresponding to the TB, the UCI comprising a HARQ process identifier and a new data indicator ("NDI").

3. The method of claim 2, further comprising:
identifying a reference NDI for the HARQ process identifier, wherein the reference NDI is a latest communicated NDI for the indicated HARQ process;
determining whether the prepared TB is a retransmission of a latest TB for the one or more HARQ processes;
wherein when the prepared TB is a retransmission of the latest TB for the one or more HARQ processes, then the method includes indicating that the prepared TB is the retransmission of the latest TB for the identified HARQ process by not toggling the NDI in the UCI as compared to the reference NDI; and
wherein when the prepared TB is not the retransmission of the latest TB for the one or more HARQ processes, then the method includes indicating that the prepared TB is not the retransmission of the latest TB for the identified HARQ process by toggling the NDI in the UCI as compared to the reference NDI.

4. The method of claim 1, further comprising receiving the uplink grant in the second transmit opportunity n−k, the uplink grant comprising a HARQ process identifier and a new data indicator ("NDI"), wherein the HARQ process identifier indicates a respective HARQ process of the one or more HARQ processes eligible for AUL transmission.

5. The method of claim 4, further comprising:
identifying a reference NDI for the HARQ process identifier, wherein the reference NDI is a latest communicated NDI for the indicated HARQ process; and
comparing the uplink grant NDI to the reference NDI, wherein preparing the TB comprises preparing a retransmission of a latest TB for the one or more HARQ processes in response to the uplink grant NDI having a same value as the reference NDI, and
wherein preparing the TB comprises preparing a new TB for the one or more HARQ processes in response to the uplink grant NDI having a different value than the reference NDI.

6. The method of claim 1, wherein the timing offset k is a fixed value.

7. The method of claim 1, wherein the timing offset k is based on a capability of the remote unit.

8. The method of claim 1, wherein the timing offset k is a dynamic value indicated via the uplink grant, wherein preparing the TB further occurs after completing detection of uplink grants in a third transmit opportunity n−kmin, where kmin is a smallest offset that can be indicated by an uplink grant.

9. The method of claim 1, wherein the transit opportunity n is associated with a first HARQ process, wherein completing detection of uplink grants comprises completing monitoring for the uplink grant for the first HARQ process.

10. The method of claim 1, wherein:
the second TB comprises one of new data for a respective HARQ process of the one or more HARQ processes indicated by the uplink grant or a retransmission of previously transmitted data for the one or more HARQ processes indicated by the uplink grant; and
no AUL transmission is made during the transmit opportunity n in response to receiving the uplink grant prior to expiration of the maximum amount of time defining the second transmit opportunity n−k.

11. An apparatus comprising:
a transceiver; and
a processor coupled to the transceiver, the processor configured to cause the apparatus to:
identify a transmit opportunity n for autonomous uplink ("AUL") transmission, wherein the transmit opportunity n is a part of a semi-persistently scheduled uplink grant that is valid over multiple transmission opportunities, the AUL transmission being associated with a set of eligible Hybrid Automatic Repeat Request ("HARQ") processes;
identify a timing offset k between reception of an uplink grant and an uplink transmission corresponding to the uplink grant;
receive downlink feedback information ("DFI") for the AUL transmission;
determine, at an expiration of a maximum amount of after reception of the DFI, whether to one of re-transmit the first uplink data or transmit second uplink data in a transport block ("TB") during the transmit opportunity n, wherein:
said maximum amount of time is k units of time prior to the transmit opportunity n and defines a second transmit opportunity n−k,
the k units of time define a minimal amount of time it takes to generate the TB;
the maximum amount of time also enables the TB to be generated as late as possible after receipt of the DFI and prior to the transmit opportunity n so that re-transmission of the first uplink data in the TB is not prematurely formed;
prepare, during the second transmit opportunity n−k, the TB for uplink transmission,
wherein, to prepare the TB, the processor is configured to cause the apparatus to prepare a first TB that is a re-transmission of the first uplink data based on an indication in the DFI in response to no uplink grant for one or more HARQ processes from the set of eligible HARQ processes being received prior to expiration of the maximum amount of time, and wherein, to prepare the TB, in response to receiving the uplink grant for the one or more HARQ processes from the set of eligible HARQ processes prior to the expiration of the maximum amount of time, the processor is configured to cause the apparatus to generate a second TB including the second uplink data; and transmit one of the prepared first TB and the prepared second TB to a mobile communication network during the transmit opportunity n.

12. The apparatus of claim 11, wherein, to transmit the AUL transmission, the processor is configured to cause the apparatus to transmit uplink control information ("UCI") corresponding to the TB, the UCI comprising a HARQ process identifier and a new data indicator ("NDI").

13. The apparatus of claim 12, wherein the processor is configued to cause the apparatus to:

identify a reference NDI for the HARQ process identifier, wherein the reference NDI is a latest communicated NDI for the indicated HARQ process;

determine whether the prepared TB is a retransmission of a latest TB for the one or more HARQ processes;

wherein when the prepared TB is the retransmission of the latest TB for the one or more HARQ processes, then the processor is configured to cause the apparatus to indicate that the prepared TB is the retransmission of the latest TB for the identified HARQ process by not toggling the NDI in the UCI as compared to the reference NDI; and wherein when the prepared TB is the retransmission of the latest TB for the one or more HARQ processes, then the processor is configured to cause the apparatus to indicate that the prepared TB is not the retransmission of the latest TB for the identified HARQ process by toggling the NDI in the UCI as compared to the reference NDI.

14. The apparatus of claim 11, wherein the processor is configured to cause the apparatus to receive the uplink grant in the second transmit opportunity n–k, the uplink grant comprising a HARQ process identifier and a new data indicator ("NDI"), wherein the HARQ process identifier indicates a respective HARQ process of the one or more HARQ processes eligible for AUL transmission.

15. The apparatus of claim 14, wherein the processor is configured to cause the apparatus to:

identify a reference NDI for the HARQ process identifier, wherein the reference NDI is a latest communicated NDI for the indicated HARQ process; and compare the uplink grant NDI to the reference NDI, wherein, to prepare the TB, the processor is configured to cause the apparatus to prepare a retransmission of a latest TB for the one or more HARQ processes in response to the uplink grant NDI having a same value as the reference NDI, and wherein, to prepare the TB, the processor is configured to cause the apparatus to prepare a new TB for the one or more HARQ processes in response to the uplink grant NDI having a different value than the reference NDI.

16. The apparatus of claim 11, wherein the timing offset k is a fixed value.

17. The apparatus of claim 11, wherein the timing offset k is based on a capability of the apparatus.

18. The apparatus of claim 11, wherein the timing offset k is a dynamic value indicated via the uplink grant, wherein the processor is configured to cause the apparatus to prepare the TB after completing detection of uplink grants in a third transmit opportunity n–kmin, where kmin is a smallest offset that can be indicated by an uplink grant.

19. The apparatus of claim 18, wherein the transmit opportunity n is associated with a first HARQ process, wherein, to complete detection of uplink grants, the processor is configured to cause the apparatus to complete monitoring for the uplink grant for the first HARQ process.

20. The apparatus of claim 11, wherein:

the second TB comprises one of new data for a respective HARQ process of the one or more HARQ processes indicated by the uplink grant or a retransmission of previously transmitted data for the one or more HARQ processes indicated by the uplink grant; and no AUL transmission is made during the transmit opportunity n in response to receiving the uplink grant prior to expiration of the maximum amount of time defining the second transmit opportunity n–k.

\* \* \* \* \*